United States Patent [19]
Grossi et al.

[11] 4,436,864
[45] * Mar. 13, 1984

[54] AQUEOUS EMULSIONS OF ACRYLAMIDE AND RUBBER MODIFIED ASPHALTS

[75] Inventors: Anthony V. Grossi, Newark; Leon A. Hagelee, Minerva Park; Louis T. Hahn; Alfred Marzocchi, both of Newark, all of Ohio

[73] Assignee: Owens-Corning Fiberglas Corporation, Toledo, Ohio

[*] Notice: The portion of the term of this patent subsequent to Dec. 6, 2000 has been disclaimed.

[21] Appl. No.: 453,031

[22] Filed: Dec. 27, 1982

Related U.S. Application Data

[63] Continuation-in-part of Ser. No. 329,902, Dec. 11, 1981, Pat. No. 4,394,481.

[51] Int. Cl.³ .............................................. C08L 91/00
[52] U.S. Cl. ..................................... 524/458; 524/69; 524/71; 524/59; 524/555; 525/54.5
[58] Field of Search ................... 525/54.5; 524/69, 71, 524/59, 555, 458

[56] References Cited

U.S. PATENT DOCUMENTS

| 2,716,616 | 8/1955 | Rendall et al. | 106/273 |
| 2,888,407 | 5/1959 | Cooper et al. | 260/2.5 |
| 3,096,190 | 7/1963 | DeGroote et al. | 106/273 |
| 3,259,512 | 7/1966 | Dickson et al. | 106/273 |
| 3,303,151 | 2/1967 | Peters et al. | 260/28.5 |
| 3,513,005 | 5/1970 | Bradshaw et al. | 106/277 |
| 3,547,850 | 12/1970 | Montgomery | 260/28.5 |
| 3,997,354 | 12/1976 | Pivette et al. | 106/277 |
| 4,273,588 | 6/1981 | Marzocchi et al. | 106/273 N |
| 4,273,685 | 6/1981 | Marzocchi et al. | 260/28.5 |
| 4,316,829 | 2/1982 | Roberts | 260/28.5 |

OTHER PUBLICATIONS

English–Abstract of Japanese Patent No. 9052287, Date: May 21, 1974.

Primary Examiner—Melvyn I. Marquis
Attorney, Agent, or Firm—Ronald C. Hudgens; Robert F. Rywalski

[57] ABSTRACT

An aqueous asphaltic emulsion is provided in which the dispersed asphaltic material is the prereacted reaction product of asphalt having a viscosity of less than about 120,000 cps (at 140° F.), an acrylamide, a vinyl aromatic monomer and an elastomer.

15 Claims, No Drawings

AQUEOUS EMULSIONS OF ACRYLAMIDE AND RUBBER MODIFIED ASPHALTS

CROSS REFERENCES

The present application is a continuation-in-part of U.S. Ser. No. 329,902 filed Dec. 11, 1981, now U.S. Pat. No. 4,394,481 which is hereby incorporated by reference.

TECHNICAL FIELD

The present invention relates to asphalt compositions, and more particularly it relates to chemically modified asphalt compositions. Even yet more particularly, the present invention relates to acrylamide modified asphalts.

BACKGROUND, SUMMARY AND INDUSTRIAL EXPLOITATION

Asphalt emulsions have been employed for numerous and wide variety of applications for many years. As is known in the art, these emulsions may be cationic, anionic or non-ionic depending on the type of emulsifier used, and they may be either rapid set, medium set or slow set. Representative of the cationic emulsifiers are the fatty amines, lignin amines, quaternary ammonium halides, including diquaternary compounds, and alkyl-substituted imidazolines. The alkylphenoxypolyalkyleneoxyalkanols, e.g., the reaction product of nonylphenol with ethylene oxide, represent a common non-ionic emulsifier while alkali metal salts of fatty acids and of petroleum sulfonates are representative anionic emulsifiers. One of the problems encountered with asphalt in such emulsions is that its adhesion to various substrates and especially to aggregate needs to be improved. Such aggregate is represented, for example, by gravel, crushed rock, slag, sand and crushed limestone. Additionally, the adhesion of asphalt needs to be improved with respect to other material such as, for example, cementitious materials, metals, glass and the like.

An improved asphaltic emulsion is provided in accordance with this invention, in which the asphaltic composition in the emulsion is the product produced by reacting an acrylamide with asphalt having a viscosity of less than about 120,000 cps, and most desirably less than about 60,000 cps (at 140° F.), a vinyl aromatic monomer and a rubbery polymer.

Some of the desirable properties of the present emulsions and the asphaltic material therein include improved coatability of negatively charged surfaces, improved adhesion, less stripping, improved flexibility, particularly at low temperatures, improved strength, reduced high temperature flow, increased durability, better compatibility with polymers.

While such asphalt emulsions are of great value for many applications, an emulsion of an asphaltic material having the desirable properties noted above would be of even greater value provided the material can be easily emulsified using conventional emulsion manufacturing equipment and emulsifiers. The present invention provides such a material and such an emulsion.

DESCRIPTION

The asphaltic emulsions of the present invention contain a chemically modified asphalt which is obtained by heating the above indicated ingredients at an elevated temperature for several hours. Generally, it will be noted that the reactant system is initially crumbly and breaks apart easily with a pronounced propensity for phase separation; in short, it is initially a heterogeneous, cheesy type material. Upon reaction, however, such system converts to a homogeneous tough material, i.e. a material with no substantial phase separation characteristics, and one with increased tensile strength and elastomeric properties. Preferably, the reacting is done by heating at a temperature of at least 120° C., preferably at least 150° C., for about 10 hours, and most desirably, at a temperature of about 160° C. to about 190° C. for about 20 hours to about 24 hours.

The acrylamides employed in the present invention are unpolymerized and have a double bond. Desirably, they may be secondary amides or tertiary amides. Preferably, the acrylamide will be a compound of the formula

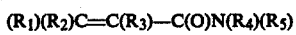

wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms, or preferably a radical of the formula

wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide, that is a compound of the formula

The double bond provides for the ability to chemically incorporate the acrylamide into the composition. Additionally, the amino groups present in the acrylamides provide for highly desirable polarity which serves to greatly enhance the adhesive bonding of the present compositions to various substrates, including, for example, aggregates commonly employed in road repair and maintenance, as well as cementitious and other substrates. Representative acrylamides include
N,N-dimethylaminopropylmethacrylamide,
N,N-dimethylaminoisopropylmethacrylamide,
N,N-dimethylaminoethylmethacrylamide,
N-methylaminopropylmethacrylamide,
N-methylaminoisopropylmethacrylamide,
N-methylaminoethylmethacrylamide, aminopropylmethacrylamide, aminoisopropylmethacrylamide, aminoethylmethacrylamide,
N,N-diethylaminopropylmethacrylamide,
N,N-diethylaminoisopropylmethacrylamide,
N,N-diethylaminoethylmethacrylamide,
N-ethylaminopropylmethacrylamide,
N-ethylaminoisopropylmethacrylamide,
N-ethylaminoethylmethacrylamide,
N-ethyl,N-methylaminopropylmethacrylamide,
N-ethyl,N-methylaminoisopropylmethacrylamide,
N-ethyl,N-methylaminoethylmethacrylamide,
N,N-dimethylaminopropylacrylamide,
N,N-dimethylaminoisopropylacrylamide,
N,N-dimethylaminoethylacrylamide,
N-methylaminopropylacrylamide,
N-methylaminoisopropylacrylamide, N-methylaminoethylacrylamde, aminopropylacrylamide, aminoisopropylacrylamide, aminoethylacrylamide,
N,N-diethylaminopropylacrylamide,
N,N-diethylaminoisopropylacrylamide,
N,N-diethylaminoethylacrylamide,
N-ethylaminopropylacrylamide,
N-ethylaminoisopropylacrylamide,
N-ethylaminoethylacrylamide,
N-ethyl,N-methylaminopropylacrylamide,
N-ethyl,N-methylaminoisopropylacrylamide,
N-ethyl,N-methylaminoethylacrylamide.

The asphalt employed will have a viscosity of less than about 120,000 cps (at 140° F.), preferably less than about 75,000 cps (at 140° F.). Outstanding materials are produced from asphalt having a viscosity of about 40,000 to about 60,000 cps (at 140° F.) or less. Asphalt materials which are suitable may be selected from those which are typically used for road paving, repair and maintenance purposes. Thus, such asphalt includes natural asphalt, petroleum asphalt and petroleum tar. The natural asphalts include, for example asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Preferably, the asphalt which will be employed is an asphalt cement of the type typically used for road paving, repair and maintenance purposes. Such asphalts typically have penetrations ranging between about 20 to about 200 with AC-5 paving grade asphalt being especially suitable.

As the polymerizable vinyl monomer, use is preferably made of a monofunctional vinyl aromatic monomer having a general formula:

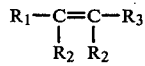

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl e.g., a $C_1$ to $C_5$ alkyl and $R_3$ is hydrogen, lower alkyl or one of the following groups:

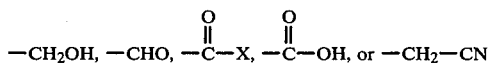

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can optionally be employed. Preferred polyfunctional monomers are those having the general formula:

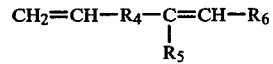

wherein $R_4$ is a divalent aromatic group containing 6 to 12 carbon atoms, and preferably a phenylene group; and, $R_5$ and $R_6$ have the same meaning as is described above with respect to $R_2$ and $R_3$, respectively, for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

As the rubbery polymer, use can be made of a number of elastomeric materials which are well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D", a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubber polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this inventon, including the hydroxy-terminated butadiene-styrene copolymer designated "Poly B-D CS-15" and hydroxy-terminated butadiene-acrylonitrile copolymers like Poly B-D CN-15 having a hydroxyl number of 39. Preferred are butadiene-styrene rubbers like SOLPRENE 1205C available from Phillips Petroleum.

The amount of the various ingredients may vary over a wide range. Preferably, however, the acrylamide will be employed in an amount of about 0.1%, and most desirably about 0.5%, to about 15%, based on the weight of asphalt, the vinyl aromatic will be used in an amount of about 0.5 to about 35% based on the weight of the asphalt, and the rubbery polymer will be employed in an amount of about 0.5 to about 30% based on the amount by weight of asphalt. In accordance with the best mode of practicing the present invention, the materials and the amounts employed will be selected to produce a final product having a viscosity of about 1200 to about 2500 cps (at 285° F.) and most desirably about 1800 to about 2000 cps.

The present compositions are easily emulsified using conventional equipment and emulsifiers. While any high speed, high shear emulsion producing mechanical devices may be used, a colloid mill is quite suitable for producing the emulsion from the above chemically modified asphalt and a suitable aqueous emulsification medium containing effective emulsifying amounts of an asphalt emulsifier. The emulsifier may be any of the well known and widely used asphalt emulsifiers, and its selection will, of course, be governed by whether a cationic, anionic or non-ionic emulsion is desired. Generally, cationic emulsions are preferred and preferred emulsifiers are the fatty amines and most desirably fatty primary monoamines. The solids content of the emulsions may very but generally will desirably be about 50-70% solids and preferably about 60-65%. In general, it has been observed that the amount of emulsifier needed to produce outstanding emulsions of the present chemically modified asphalts will be larger, e.g. about 100% more, than that needed to emulsify a non-chemically modified asphalt. Such amounts will be easily and routinely optimized by those skilled in the art.

While the above described the invention with sufficient particularity to enable those skilled in the art to make and use same, nonetheless further examplification follows.

Example

Using a charge of about 80% by weight of AC-5 asphalt, 0.5% by weight of dimethylaminopropylmethacrylamide (DMAPMA), about 9.5% by weight of styrene, and about 10% by weight of Solprene 1205C styrene-butadiene elastomer having a molecular weight of about 80,000 to about 100,000, a composition was produced as follows. Asphalt, at a temperature of about 250° F. to about 310° F. was pumped into a reactor equipped with an agitator and a reflux condenser and followed by the addition of the rubber, DMAPMA and styrene. The ingredients were then heated at a temperature of about 348° F. for about 24 hours with agitation and under reflux. The reacted material has a viscosity of 1800-2000 cps at 285° F.

A cationic rapid set (CRS) emulsion of the above chemically modified asphalt was prepared as follows. An aqueous emulsification medium was formulated containing about 1.5% by weight of Arosurf AA-60 emulsifier (oleyl amine) and about 0.25% by weight of hydroxyethyl cellulose as a stabilizer, the pH being adjusted to about 2.5-3.5 using hydrochloric acid. Using a colloid mill, an emulsion was prepared using about 60% to about 65% (by weight) of the above chemically modified asphalt and about 35% to about 40% of the aqueous emulsification medium. The chemically modified asphalt was supplied to the colloid mill at a temperature of about 285° F. and the aqueous emulsification medium at a temperature of about 100° F.

The emulsion is well adapted for use as a cold overlay, joint sealer, and may be used as a surface treatment for highways, roads and the like as well as waterproof coatings. If desired glass fibers and glass flakes may be added to the emulsion for reinforcing purposes. The present emulsions are outstandingly adapted for use in slurry seal applications by blending with a conventional slurry seal asphaltic emulsion as disclosed in application U.S. Ser. No. 453,067 which is hereby incorporated by reference and which is concurrently being filed.

While the above describes the present invention, it will, of course, be apparent that modifications are possible which, pursuant to the patent statutes and laws, do not depart from the spirit and scope thereof.

We claim:

1. In an asphalt emulsion comprising water, an asphaltic material and effective emulsifying amounts of an emulsifier, the improvement wherein said asphaltic material is the prereacted reaction product produced by reacting an acrylamide, asphalt having a viscosity of less than about 120,000 cps (at 140° F.), a vinyl aromatic monomer and a rubbery polymer.

2. The emulsion of claim 1 wherein said acrylamide is a compound of the formula $$(R_1)(R_2)C=C(R_3)-C(O)N(R_4)(R_5)$$

wherein $R_1$, $R_2$ and $R_3$ are independently selected from hydrogen and a $C_1$-$C_3$ alkyl; $R_4$ and $R_5$ are independently selected from hydrogen, a $C_1$-$C_3$ alkyl and a radical of the formula $$-R_6-N(R_7)(R_8)$$

wherein $R_6$ is an alkylene group of 1 to 5 carbon atoms and $R_7$ and $R_8$ are independently selected from hydrogen or a $C_1$-$C_3$ alkyl.

3. The emulsion of claim 2 wherein $R_4$ or $R_5$ is said radical of the formula $-R_6-N(R_7)(R_8)$ and wherein said asphalt has a viscosity of less than about 75,000 cps (at 140° F.).

4. The emulsion of claim 3 wherein $R_1$ and $R_2$ are hydrogen.

5. The emulsion of claim 3 wherein $R_6$ is ethylene or propylene.

6. The emulsion of claim 3 wherein $R_3$, $R_7$ and $R_8$ are hydrogen or methyl.

7. The emulsion of claim 2 wherein said acrylamide is dimethylaminopropylmethacrylamide said vinyl aromatic monomer comprises styrene, said asphalt has a viscosity of about 40,000 to about 60,000 cps and said rubbery polymer is a copolymer of styrene and butadiene.

8. The emulsion of claim 2 where said rubbery polymer is natural rubber or a homopolymer of a diene or a copolymer of a diene and an olefinically unsaturated monomer.

9. A method comprising charging into a reactor an acrylamide compound having a double bond, asphalt having a viscosity of less than about 120,000 cps (at 140° F.), a vinyl aromatic monomer, and a rubbery polymer which is natural rubber or a homopolymer of a diene or a copolymer of a diene and an olefinically unsaturated monomer, heating the materials at an elevated temperature for several hours and emulsifying the product in the presence of water and effective emulsifying amounts of an emulsifier.

10. The method of claim 9 wherein said acrylamide compound is a compound of the formula $$(R_1)(R_2)C=C(R_3)-C(O)N(R_4)(R_5)$$

wherein $R_1$, $R_2$ and $R_3$ are independently selected from hydrogen and a $C_1$-$C_3$ alkyl; $R_4$ and $R_5$ are independently selected from hydrogen, a $C_1$-$C_3$ alkyl and a radical of the formula $$-R_6-N(R_7)(R_8)$$

wherein $R_6$ is an alkylene group containing 1 to 5 carbon atoms and $R_7$ and $R_8$ are independently selected from hydrogen and a $C_1$-$C_3$ alkyl and wherein such asphalt has a viscosity of less than about 75,000 cps.

11. The method of claim 10 wherein said vinyl aromatic monomer is styrene and wherein said rubber is a copolymer of styrene and butadiene.

12. The method of claim 11 wherein said acrylamide is dimethylaminopropylmethacrylamide and wherein said asphalt has a viscosity of about 40,000 to about 60,000 cps.

13. The method of claim 10 wherein $R_4$ is hydrogen.

14. The method of claim 13 wherein $R_7$ and $R_8$ are a $C_1$–$C_3$ alkyl.

15. The method of claim 14 wherein said emulsifier is a fatty amine.

* * * * *